United States Patent [19]

Parkinson

[11] 4,329,083
[45] May 11, 1982

[54] METHODS OF LAYING UNDERGROUND CONDUITS

[75] Inventor: Jonathan J. Parkinson, Fontenay-aux-Roses, France

[73] Assignee: Societe Soletanche, Nanterre, France

[21] Appl. No.: 91,516

[22] Filed: Nov. 5, 1979

Related U.S. Application Data

[63] Continuation of Ser. No. 872,672, Jan. 26, 1978, abandoned.

[30] Foreign Application Priority Data

Jan. 26, 1977 [FR] France ................................ 77 02140
Sep. 13, 1977 [FR] France ................................ 77 27591

[51] Int. Cl.³ ............................................. F16L 1/00
[52] U.S. Cl. .................................. 405/154; 405/267; 405/155
[58] Field of Search ............................. 405/154–157, 405/174–184, 267, 268, 266

[56] References Cited

U.S. PATENT DOCUMENTS

| 1,744,102 | 1/1930 | Burke | 405/154 |
| 3,431,736 | 3/1969 | Ueda | 405/267 |
| 3,564,855 | 2/1971 | Morner | 405/267 |
| 3,759,044 | 9/1973 | Caron et al. | 405/267 |
| 3,820,344 | 6/1974 | Caron et al. | 405/267 |

FOREIGN PATENT DOCUMENTS 1243584  8/1971  United Kingdom ............... 405/267

Primary Examiner—Dennis L. Taylor
Attorney, Agent, or Firm—Robert Scobey

[57] ABSTRACT

The invention relates to a method of laying underground conduits along a trench dug into the ground and filled with sludge designed to prevent the trench walls from collapsing.

The trench is at least partly lined with hardenable grout and the conduit laying operations are carried out under the protection of this grout so that, after the same has hardened, it seals the conduit into the ground.

11 Claims, 9 Drawing Figures

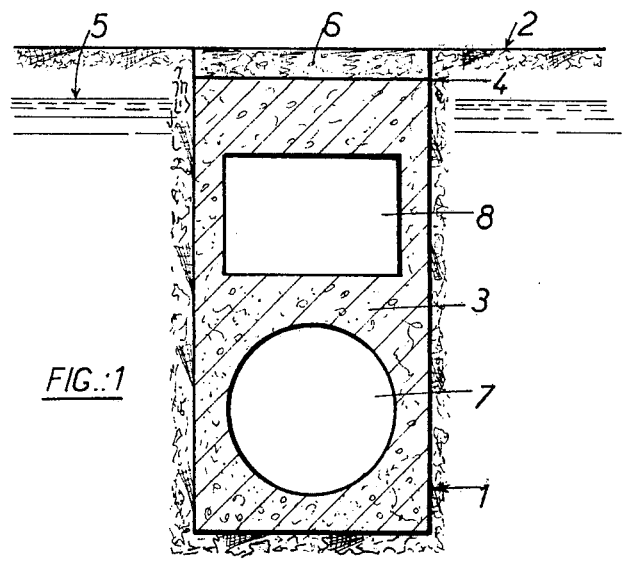
FIG.:1
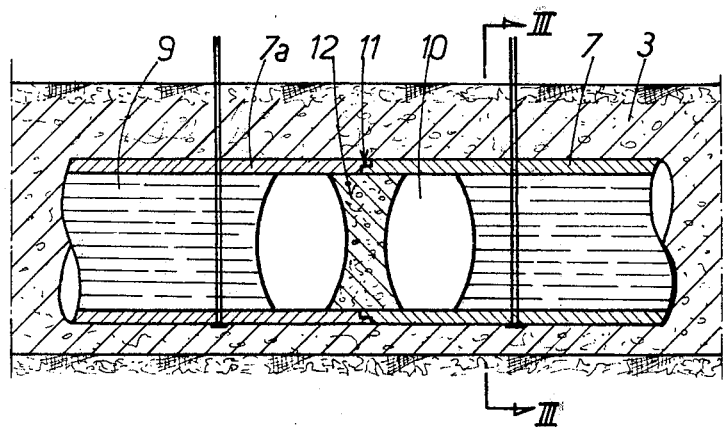
FIG.:2
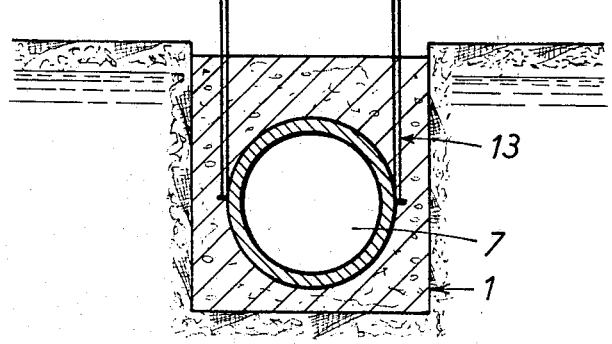
FIG.:3

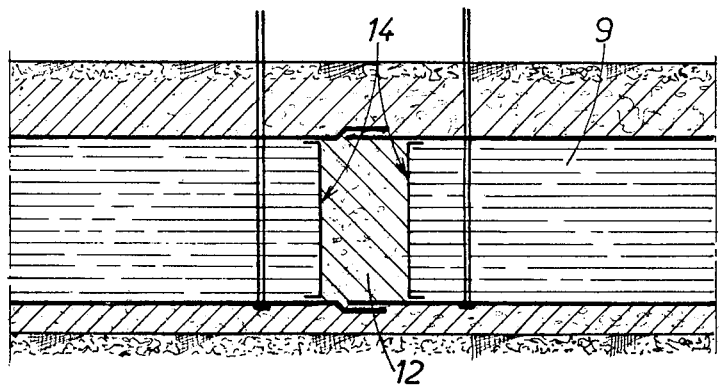
FIG.: 4
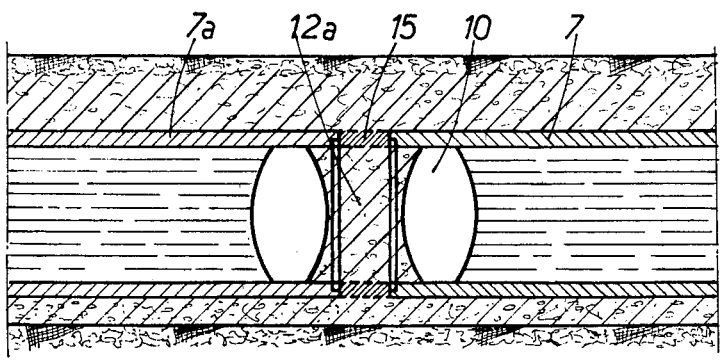
FIG.: 5
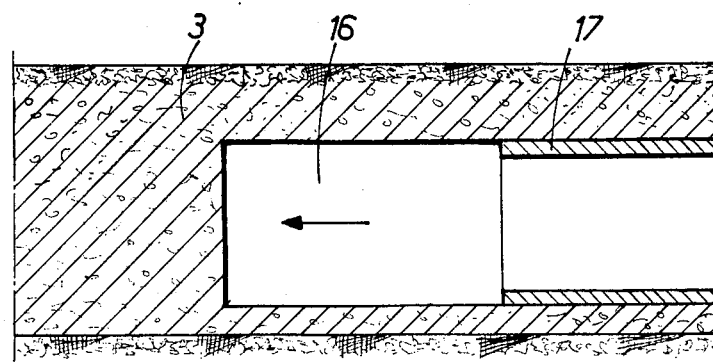
FIG.: 6
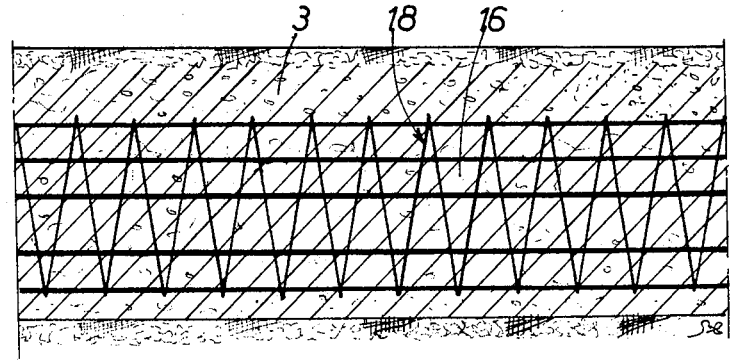
FIG.: 7

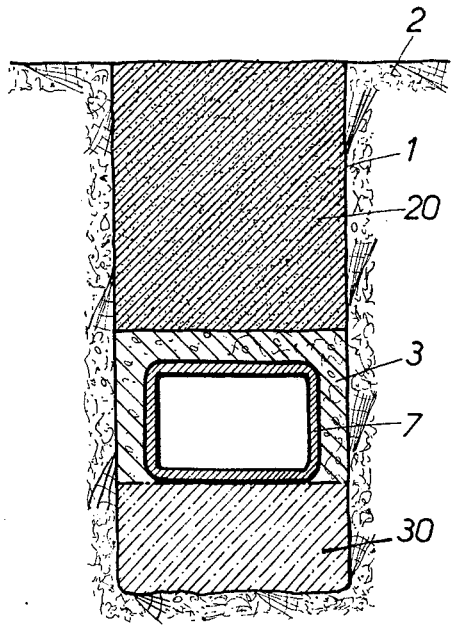
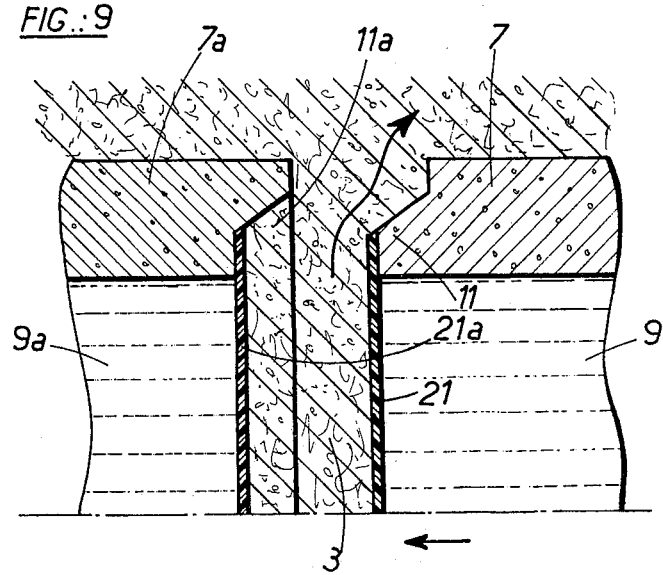

METHODS OF LAYING UNDERGROUND CONDUITS

This is a continuation, of application Ser. No. 872,672 filed Jan. 26, 1978, now abandoned.

The present invention relates to the laying of underground conduits, hereinafter referred to as "lines". The word "line" is to be understood as embracing solid or hollow lines which in principle have a constant cross-section and the transverse dimensions of which are immaterial.

While the invention is of special interest in the case of large diameters, that is, underground works, sanitation manifolds or water mains, it is to be understood that it is likewise applicable for laying tubes of smaller diameter, an example being the tubular plastic sheaths used by the post and telecommunications authorities. The invention can also be used to lay underground metal tubing such as pipelines, or cables such as electric cables.

The growing number of housing developments and the resulting increase in the consumption of water and various fluids, the consequent increase in the quantity of waste such as sullage and, generally speaking, today's requirements for moving liquid, semi-liquid or even gaseous materials entail laying ever greater lengths of underground transmission lines which commonly include sewers, mains, pipelines, tubes, piping, and so forth.

The customary technique used for laying such lines consists in first preparing a trench, excavated by any convenient means, along the bottom of which the line is laid.

The next operation consists in filling in the trench and in restoring the surface ground as nearly as possible to its original appearance.

In cases where the soil encountered is of low or fairly low cohesion, it becomes necessary to curb the trench until it is backfilled in order to prevent its walls from collapsing.

Further, when the level of the ground-water table lies above the bottom of the trench, it is necessary to pump out the water which seeps in.

Such curbing and pumping means are a further source of technical complication and delay.

In order to combat the infiltration of water from the ground-water table into the trench, it is even frequently necessary to bring about a temporary lowering of the layer, usually by means of wellpoints, the effect of which, especially in urban areas, is to sometimes produce a settling of the ground that can be damaging to nearby buildings.

It has also been proposed to support the trench walls with thixotropic sludge, such as bentonite-based sludge, but the disadvantage of this method is that this sludge fails to hold the line in position satisfactorily.

The present invention has for its principal object to overcome the above-mentioned drawbacks.

In accordance with this invention, hardenable sludge or grout is used to line the trench before proceeding with the work required for laying the line under the protection of said sludge or grout, whereby once the same has hardened it seals the line into the ground. This makes it possible to very rapidly prepare a trench of suitable dimensions with a minimum of technical complications and without damage to adjoining property.

In one form of embodiment of the invention, immediately after the trench is excavated and before the sludge or grout referred to preceedingly has hardened, generally tubular elements of appropriate size are buried into the bottom of the trench and subsequently become the manifold requiring to be built.

Another advantage of this invention is that the pressure exerted on the manifold by the hardened grout is uniform, thereby avoiding movement or cracking of the manifold with the passage of time.

Alternatively, it is possible to wait for the hardenable grout to set and then build the line within the hardened grout, identical advantages of elimination of the trench wall curbing and the need to lower the ground-water table remaining unaffected.

These two methods can be combined, for instance when laying several lines.

The trench can be lined with hardenable grout virtually throughout; however, in certain cases, especially if wide and deep trenches are involved, this entails the consumption of a large quantity of binder and therefore increases the cost of the process.

In accordance with an alternative embodiment, the trench is dug under the protection of a sludge which contains no hardenable binder and is therefore cheaper, an example being an ordinary bentonite sludge, after which advantage is taken of the fact that such sludges have a lower density than hardenable sealing products to replace this sludge at the bottom of the trench with a hardenable sealing product used in a quantity just enough to seal the line.

Since the function of ground support is performed by the nonhardenable sludge, one is not limited in the choice of a sealing product, which may be any convenient product such as possibly reinforced mortar or concrete lean or rich in cement, or any other suitable product, such as one based on hydrocarbon-containing binders.

After the sealing product has hardened, the trench can be backfilled with any convenient product, such as with dirt from the excavated trench. Alternatively, the bentonite sludge can be left to set, or else any convenient infrastructure can be built and made to rest on the hardened sealing product encasing the line.

Thus the costlier products are restricted to that part of the trench where their presence is useful, and the resulting saving can be substantial.

Likewise with economy in mind, it is possible, in combination or not with the alternative embodiment referred to preceedingly and in cases where the line is formed of plugged elements lowered into the trench and then interconnected, to simplify this method by sealing off the elements with membranes made of flexible plastics, say, bonded to the ends of said elements.

This improvement is applicable to elements of any cross-section and of any size.

The description which follows with reference to the accompanying nonlimitative exemplary drawings will give a clear understanding of how the invention can be carried into practice, such particularities as emerge either from the drawings or the description obviously falling within the scope of the invention.

In the drawings:

FIG. 1 is a diagrammatic cross-section showing two superimposed lines laid in aquiferous soil for which hardenable sludge or grout has been substituted over the trench section;

FIG. 2 is a diagrammatic longitudinal section illustrating the laying and interconnection of two pipe elements;

FIG. 3 is a section on the line III—III of FIG. 2;

FIGS. 4 and 5 are showings similar to that of FIG. 2 but relating to alternative embodiments;

FIG. 6 is a diagrammatic longitudinal section illustrating direct construction of a line in sludge or grout substituted for the soil;

FIG. 7 is a similar view to FIG. 5 but showing an alternative embodiment involving the prior positioning of a reinforcement;

FIG. 8 is a diagrammatic vertical section through a trench in which a line has been sealed with economical use of binder; and FIG. 9 is a fragmental sectional view on an enlarged scale showing elements sealed off with bonded membranes.

Reference is first had to FIG. 1 for a sectional illustration of a trench 1 dug through the natural ground 2 and filled with grout 3 forming a hardenable sludge. This grout is composed of a mixture of water, clay or bentonite, cement and adjuvants, for example.

The roof of the grout is at 4. The ground-water table is at a lower level 5.

The difference in level between 4 and 5 allows an overpressure to be maintained in relation to the ground-water table.

In the case of the difference in level between 2 and 4, it permits reconstituting the original terrain, or, in an urban site, the carriageway 6.

Buried within grout 3 is a tubular manifold 7 above which is likewise buried a rectangular element 8.

While the elements 7 and 8 can be of any suitable dimensions, the latter are preferably such as to permit inspections by a man.

Referring next to FIG. 2, the trench 1 is shown already dug and filled with grout 3.

Using appropriate mechanical or nonmechanical appliances, a manifold element 7 is laid in the nonhardened grout after said element has been weighted with ballast such as water 9.

The ends of each element of manifold 7 are sealed off with an inflatable mask 10 which prevents the ballast from escaping and the grout 3 from finding its way into the elements 7.

The adjoining element 7a is then installed by positively engaging it over the element 7 through the agency of grooves or other appropriately formed shapes 11.

After several consecutive line elements have been laid, a previously provided access well (not shown) is used to remove the first sealing means encountered and to discharge the ballast, after which a man enters the line and reaches the second sealing means 10, which he proceeds to remove the thereby gains access to a portion of grout 12 inserted between the two consecutive sealing means of adjacent elements 7 and 7a. He destroys this portion 12, and so on until the next access well is reached.

FIG. 3 illustrates in cross-section the principle whereby the line 7 is laid along the trench 1 with the help of guides 13 which have the dual effect of centering the line 7 in the middle of trench 1 and positioning it at the required depth and slope.

FIG. 4 shows an alternative embodiment in which the sealing means 10 are replaced by a plate 14. In this case also the line is filled with ballast water 9 between the two plates 14 at either of its ends. These plates can be made of any convenient material, but preferably one which is easy to destroy, such as a synthetic plastic. The strength characteristics, such as in the case of sealing means 10, do not need to be high since the pressures exerted by ballast water 9 and the nonhardened grout 12 balance out.

FIG. 5 is similar to FIG. 2, but the two adjacent elements 7 and 7a are shown as not being joined, and consequently a wider portion of grout 12a results.

When the workman has eliminated sealing means 10, he reaches the grout 12a and must then build up a concrete ring 15 to interconnect the two line elements 7 and 7a. He then proceeds to eliminate the next sealing means, and so on.

Reference is now had to FIG. 6 for an illustration of how it is possible to lay a line of large size without having to bury prefabricated tubes beforehand.

After the trench 1 has been excavated and filled with grout 3, the same is allowed to harden without previously burying any prefabricated element in it; then, with the help of an access well (not shown), a longitudinal tunnel 16 is dug, this task being greatly facilitated because of the perfect homogeneity of the soil encountered and the complete absence of water. Such tunnel can be dug to the appropriate diameter without difficulty. All that is then necessary is to provide the concrete lining 17 either by shuttering or by the gun-applied concrete technique, which lining, once cleaned, will constitute the line to be constructed.

FIG. 7 shows how, as an alternative to the method of FIG. 6, it is possible to previously bury a metallic reinforcement 18 of sufficient diameter in the grout 3, thereby to enable the tunnel 16 to be dug behind the shelter provided by this reinforcement. The concrete lining 17 can subsequently incorporate the reinforcement 18.

Reference is next had to FIG. 8 which shows a trench 1 dug in the natural ground 2 under the protection of a mass of bentonite sludge 20 intended, as well known per se, for supporting the walls of the trench.

The line 7 is sealed at the bottom of the trench in a mass of hardenable sealing product 3 substituted in the required amount for part of the mass 20 of lower density.

This substitution can be made at any stage in the construction process. Irrespective of whether it is continuous or made up of interconnected elements, the line is preferably lowered after the sealing mass 3 has been placed in position, though naturally before the same has set, the quantity of sealing mass 3 being calculated with due account for the volume occupied by the line.

It is alternatively possible to provide, at the bottom of the trench, a bed 30 so devised that it possess a strength greater than that of sealing mass 3 after hardening, its main purpose being to ensure that the line is properly stabilized or supported (shown in dash-lines in FIG. 1).

For density reasons, this bed will in most cases be poured beneath the sludge 20, before the placing of sealing mass 3, but it will be manifest that the operations of laying the bed 30, the line 7 and the mass 3 can be carried out in whichever order is most convenient.

In the case of the line made up of interconnected, sealed-off and ballasted elements as described precedingly, it is a teaching of this invention that the elements 7 (or 7a) can be sealed off by means of flexible membranes 21 (or 21a) made of polyethylene, for example, as shown in FIG. 9.

In the case of the male end, such as that of element 7 shown on the right-hand side of the figure, membrane 21 is bonded to the end of peripheral strip 11, while in the case of the female end of the associated element 7a the membrane 21a is bonded to the bottom of the complementary back band 11a. The membranes are stretched flat.

As the elements 7 and 7a are moved together, the mass 3 included between their ends flows back and the membranes lie virtually side by side when the elements engage into each other, thus making it extremely easy to disengage the line since it is necessary only to cut out the membranes along the interior surface of the line.

The membranes 21 and 21a can be used with lines having a variety of cross-sections, examples being single, multiple, circular or polygonal cross-sections, and even very large cross-sections by reason of the presence of the ballast 9, 9a which ensures that the pressures on either side of the membranes balance out when the line elements are plunged into the masses 20 and 3 contained in the trench.

It goes without saying that changes and substitutions may be made in the exemplary forms of embodiment hereinbefore described, without departing from the scope of the invention. In particular, recourse can be had to any pipeline construction method, by feeding a flexible metal or plastic tube of appropriate diameter into a trench filled with not yet hardened grout.

In cases where it is required to lay multiple tube elements of somewhat small diameter (8 centimeters for instance) in clusters of twelve or more, it is likewise possible to set such flexible tubes onto the bottom of the trench and to restrain them by any convenient external or internal means.

I claim:

1. A method of installing a conduit in the ground comprising digging a trench in the ground while keeping said trench at least partially filled with a thixotropic mud to prevent collapse of the trench walls and installing the conduit in said trench, said thixotropic mud containing hardenable sealing products at least in the part of said trench wherein said conduit is located, and retaining said conduit in said trench to seal it in the ground after said products have hardened.

2. A method as claimed in claim 1 wherein said hardenable sealing products comprise a hardenable binding agent which is mixed with said mud whereby said mud is a self-hardening mud.

3. A method as claimed in claim 1 wherein said conduit is lowered into said trench prior to hardening of said products and is maintained suspended in said trench until said products have hardened.

4. A method of installing a conduit in the ground comprising digging a trench in the ground while keeping said trench at least partially filled with a thixotropic mud to prevent collapse of the trench walls and installing the conduit in said trench, said thixotropic mud containing hardenable sealing products at least in the part of said trench wherein said conduit is located whereby said conduit is sealed in the ground after said products have hardened, wherein conduit elements for forming said conduit are obturated by sealing means at their ends and weighted prior to being lowered into said trench, and are interconnected when they lie under said mud, the conduit being cleared after the conduit elements have been interconnected.

5. A method as claimed in claim 4 wherein said conduit elements are directly interconnected.

6. A method as claimed in claim 4 wherein said conduit elements are axially located within said trench at a distance from one another and are interconnected after hardening of said products by elimination of said sealing means and of the hardened product located between said conduit elements, auxiliary connecting elements being installed between the respective conduit elements.

7. A method as claimed in claim 5 wherein said sealing means comprise membranes bonded to the ends of said conduit elements, said membranes being flat and adapted to come into contact with each other when said conduit elements are interconnected.

8. A method as claimed in claim 1 wherein, after said products have hardened, a tunnel is dug therethrough and said conduit is installed therein.

9. A method as claimed in claim 8 wherein reinforcement means are incorporated into said products before said tunnel is dug.

10. A method as claimed in claim 1 wherein said hardenable sealing products have a specific weight higher than the specific weight of said mud and are substituted for a part of said mud after said trench has been dug.

11. A method as claimed in claim 10 wherein a hardenable product having a strength higher than the strength of said sealing product is substituted for said mud in the lower part of said trench, beneath said sealing products.

* * * * *